United States Patent Office 3,547,620
Patented Dec. 15, 1970

3,547,620
N-(OXAMETHYL)ALPHA-HALO-ACETANILIDE HERBICIDES
John F. Olin, Ballwin, Mo., assignor to Monsanto Company, St. Louis, Mo., a corporation of Delaware
No Drawing. Continuation-in-part of application Ser. No. 632,476, Jan. 27, 1967, which is a division of application Ser. No. 496,175, Oct. 14, 1965, which in turn is a continuation-in-part of application Ser. No. 329,223, Dec. 9, 1963, which also in turn is a continuation-in-part of application Ser. No. 134,161, Aug. 28, 1961. This application Jan. 23, 1969, Ser. No. 793,567
Int. Cl. A01n 9/20, 9/12
U.S. Cl. 71—118
34 Claims

ABSTRACT OF THE DISCLOSURE

Phytotoxicants containing an alpha-haloacetanilide of the formula

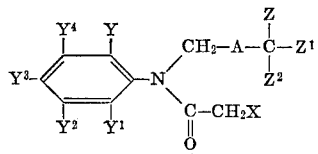

wherein:

Y and $Y^1$ are hydrogen, alkyl or alkoxy each of a maximum of 10 carbon atoms,
$Y^2$, $Y^3$, and $Y^4$ are hydrogen, halogen, or alkyl each of a maximum of 10 carbon atoms,
A is oxygen or sulfur,
X is chlorine, bromine, or iodine, and
Z, $Z^1$ and $Z^2$ are hydrogen, alkyl, alkenyl, alkynyl, alkoxy, polyalkoxy, alkoxyalkyl, polyalkoxyalkyl, haloalkyl, hydroxyalkyl, haloalkenyl, oxoalkyl, alkenyloxy and alkyl each of a maximum of 18 carbon atoms; aryl, aryloxyalkyl, haloaryl, haloaryloxyalkyl and arylalkyl of from 6 to 24 carbon atoms; furfuryl; and tetrahydrofurfuryl; or two of Z, $Z^1$ or $Z^2$ groups are combined to form a cyclic group of from 2 to 6 carbon atoms selected from the group consisting of

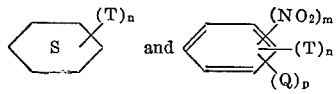

wherein T is chlorine, bromine or fluorine, Q is alkyl of a maximum of 6 carbon atoms or acyl of a maximum of 4 carbon atoms, m is an integer of from 0 to 3 inclusive, n is an integer of from 0 to 5 inclusive, and p is an integer of 0 or 1.

---

This application is a continuation-in-part application of copending application Ser. No. 632,476, filed Jan. 27, 1967, now abandoned, which in turn is a division of copending application Ser. No. 496,175, filed Oct. 14, 1965, and now abandoned, which in turn is a continuation-in-part application of application Ser. No. 329,223, filed Dec. 9, 1963, and now abandoned, which in turn is a continuation-in-part application of copending application Ser. No. 134,161, filed Aug. 28, 1961, and now abandoned.

This invention relates to phytotoxicants and the control of plant systems, including germinating seeds, emerging seedlings, and fully developed plants therewith; and to phytotoxic compositions and the preparation thereof.

The term "phytotoxicant" is used herein to designate materials having a modifying effect upon the growth or development of vegetation. Such modifying effects include, for example, killing, retardation, defoliation, desiccation, regulation, stunting, tillering, stimulation, dwarfing, and other deviations from natural development. In like manner, "phytotoxic" and "phytotoxicity" are used to identify the nature and activity of the compositions of the present invention.

An object of this invention is to provide methods for the control of vegetation. Another object of the invention is to provide phytotoxicant compositions. Another object of the invention is to provide a process for making certain alphahaloacetanilides. Other aspects, objects, and advantages of this invention will be apparent from a consideration of the accompanying disclosure and the appended claims.

According to the present invention there are provided phytotoxicant compositions comprising a phytotoxic adjuvant and an alpha-haloacetanilide of the formula

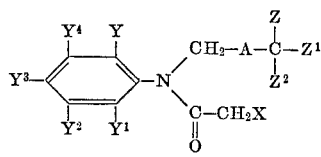

wherein:

Y and $Y^1$ are hydrogen, alkyl or alkoxy each of a maximum of 10 carbon atoms,
$Y^2$, $Y^3$, and $Y^4$ are hydrogen, halogen, or alkyl each of a maximum of 10 carbon atoms,
A is oxygen or sulfur,
X is chlorine, bromine, or iodine, and
Z, $Z^1$ and $Z^2$ are hydrogen, alkyl, alkenyl, alkynyl, alkoxy, polyalkoxy, alkoxyalkyl, polyalkoxyalkyl, haloalkyl, hydroxyalkyl, haloalkenyl, oxoalkyl, and alkenyloxyalkyl each of a maximum of 18 carbon atoms; aryl, aryloxyalkyl, haloaryl, haloaryloxyalkyl and arylalkyl of from 6 to 24 carbon atoms; furfuryl; and tetrahydrofurfuryl; or two of Z, $Z^1$ or $Z^2$ groups are combined to form a cyclic group of from 2 to 6 carbon atoms selected from the group consisting of

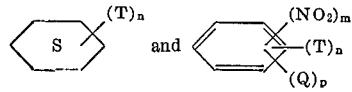

wherein T is chlorine, bromine or fluorine, Q is alkyl of a maximum of 6 carbon atoms or acyl of a maximum of 4 carbon atoms, m is an integer of from 0 to 3 inclusive, n is an integer of from 0 to 5 inclusive, and p is an integer of 0 or 1.

Unless otherwise indicated, "alkyl" is used generically to include primary, secondary, and tertiary alkyl groups.

Representative compounds of the present invention include those in which the groups of the above formula have the following identities:

Y and $Y^1$—hydrogen, methyl, ethyl, propyl, isopropyl, n-butyl, primary isobutyl, secondary isobutyl, tertiary butyl, n-amyl, branch chain amyls, the normal and branched hexyls, heptyls, octyls, nonyls, and decyls, methoxy, ethoxy, propoxy, butoxy, pentyloxy, heptyloxy, nonyloxy;

$Y^2$, $Y^3$ and $Y^4$—hydrogen, chlorine, bromine, iodine, fluorine, and the alkyl groups of Y and $Y^1$; and Z, $Z^1$, and $Z^2$—hydrogen, methyl, ethyl, propyl, isopropyl, n-butyl, primary isobutyl, secondary isobutyl, tertiary butyl, the normal and branched amyls, hexyls, heptyls, octyls, nonyls, decyls, dodecyls, tetradecyls, hexadecyls and octadecyls; chloromethyl, bromopropyl, iodobutyl, fluorohexyl, hydroxyethyl, dihydroxypropyl; the alkoxy, alkenyl, oxoalkyl, alkoxyalkyl and alkynyl groups corresponding to the above-enumerated alkyl groups; phenyl, tolyl, naphthyl, phenoxy, benzyl, phenoxyalkyl; ethylene, trimethylene, tetramethylene; furfuryl, tetrahydrofurfuryl; and the like.

Also, according to the present invention, there are provided methods for affecting developed plants, germinating seeds and emerging plant seedlings, in a manner to alter or destroy said plants and to prevent or modify the growth of said seeds and seedlings by the application of an effective amount of an alpha-haloacetanilide of the formula as described above.

According to the present invention, there is also provided a process for preparing the above compounds by reacting the corresponding N-halomethyl alpha-haloacetanilide with an alcohol or thio-alcohol.

The novel compounds of the present invention are prepared by an alcoholysis in general accordance with the equation

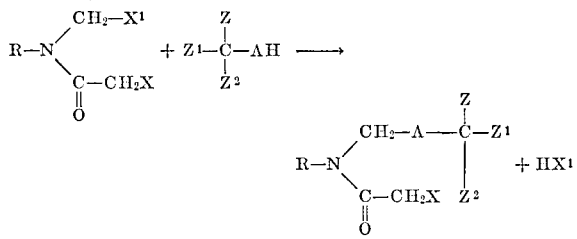

wherein R is

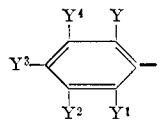

and Y, $Y^1$, $Y^2$, $Y^3$, $Y^4$, X, Z, $Z^1$, and $Z^2$ and A are as defined above and $X^1$ is a halogen. The reaction is preferably conducted in the presence of an acid binding agent. The amide starting materials used in this preparation are conveniently obtained by the addition of a haloacyl halide to N-methylene amines as described in copending application, Ser. No. 329,279, filed Dec. 9, 1963.

The surprising chemical activity of the $X^1$ halogen as compared to the lack of chemical activity on the part of the X halogen, allows the preparation in high yields of the present alpha-haloacetanilides. Normally it is desired for maximum yields that the alcohol or thioalcohol be present in at least equimolar amount to the amide starting material and preferably in excess of equimolar amount. The reaction is suitably carried out at room temperature, i.e., about 20–25° C.; however, higher or lower temperatures can be used, the temperature not being critical. The acid binding agent, preferably used in at least equimolar amount to the amount of hydrogen halide which would be expected to be formed in the reaction, can be any acid binding agent such as a tertiary amine, e.g., trimethylamine, triethylamine, pyridine, quaternary ammonium hydroxides and alcoholates, metal alcoholates, and the like, inorganic bases such as sodium hydroxide, potassium hydroxide and the like, sodium carbonate, etc. The product is insoluble in water but soluble in hydrocarbon solvents such as benzene, toluene, xylene, hexane, or the like, and can be purified by conventional crystallization or vacuum distillation methods.

These compounds are useful as herbicides, fungicides, insecticides, nematocides, algaecides, bactericides, bacteriostats, and fungistats; however, the great bulk of the compounds are primarily useful as herbicides, especially pre-emergent herbicides, and at low rates of application, as post-emergent herbicides.

The invention will be more clearly understood from the following detailed description of specific examples thereof;

EXAMPLE 1

This example describes the preparation of 2'-tert-butyl-2-chloro-N-methoxymethyl-6'-methylacetanilide. Twenty g. of 2'-tert-butyl-2-chloro-N-chloromethyl-6' - methylacetanilide was placed in a beaker and 100 ml. of trimethylamine in methanol (25% solution) was added. Immediate exothermal reaction occurred, and the product which separated was water insoluble and hence not a quaternary salt. The methanol and excess trimethylamine were evaporated, water was added to the residue and the oil layer was extracted with hexane. The hexane layer containing the desired product was placed in a refrigerator and a crystalline product separated. The solid was filtered off, washed with cold hexane, and air dried. This white solid melted sharply at 77–78° C. and weighed 12.5 g. An elemental analysis of this product yielded the following results:

Calc'd for $C_{15}H_{22}ClNO_2$ (percent): C, 63.5; H, 7.8; Cl, 12.5. Found (percent): C, 63.3; H, 7.9; Cl, 12.5.

EXAMPLE 2

This example describes the preparation of 2-bromo-2'-tert - butyl-N-methoxymethyl-6'-methylacetanilide. About 1414 g. (7 moles) of bromacetyl bromide and a quart of dry toluene were introduced into a 5-liter 4-neck flask, and about 1200 g. (6.86 moles) of 2-tert-butyl-6-methyl-N-methyleneaniline were gradually added during a one-hour period while maintaining the temperature within the range of 30–40° C. The reaction mixture was maintained at a temperature of approximately 45° C. for one hour and allowed to stand for approximately 16 hours at room temperature. The resulting turbid mixture was heated to about 40° C., transferred to a separatory funnel and added in six increments to 750 g. of 50% triethylamine in methanol with stirring, keeping the temperature between 35 and 40° C. The reaction mixture was stirred for an additional hour at a temperature of 45–50° C. and then cooled. The mixture was then washed with 5 portions of water (about 1500 ml. each) and about a pint of chlorobenzene was added to facilitate separation of the heavy product layer. The bulk of the solvent was removed from the product layer by distillation at 20 mm. pressure and completed at 0.2 mm. pressure and 60° C. The mixture was cut back with 1 liter of toluene and a liter of methyl cyclohexane, and cooled to −40° C. by surrounding the flask with Dry Ice. A portion of the resultant solidified mass was isolated, dissolved in hexane, chilled with Dry Ice, filtered, washed with cold hexane, and air dried. The product thus obtained was a cream-colored solid melting at 51.5–52° C. and having the following analysis:

Calc'd for $C_{15}H_{22}BrNO_2$ (percent): C, 54.88; H, 6.76; Br, 24.37. Found (percent): C, 54.91; H, 6.75; Br, 24.34.

EXAMPLE 3

This example describes the preparation of 2'-tert-butyl-2-iodo-N-methoxymethyl-6'-methylacetanilide. 105 g. of iodoacetyl chloride and 100 g. of dry toluene were placed in a 1-liter 4-neck flask. The flask was purged with dry nitrogen, and with stirring and external cooling, 87.5 g. (0.5 mole) of 2-tertbutyl-6-methyl - N - methyleneaniline was added to the flask in incremental amounts over a period of 20 minutes keeping the temperature below 20° C. The reaction mixture was warmed to 50° C., cooled to 15° C., and to the flask was added 53 g. of triethylamine in 100 ml. of dry methanol, keeping the temperature below 15° C. The methanol and triethylamine were added over a period of one-half hour. Little heat was evolved during this addition. The flask and contents were heated over a 45-minute period at about 50° C. The flask and contents were cooled and then washed with three 500 ml. portion of water. The oil layer was removed from the water and solvent evaporated at 30 mm. to a pot temperature of 60° C. Heating was continued for an additional half hour at 60° C. and a vacuum of 0.5–0.15 mm. pressure. A small sample was taken from the residual material in the flask and dissolved in a toluene/heptane mixture and the solution was placed in Dry Ice. No precipitate was obtained. The balance of the residual material in the flask was dissolved in 300 ml. of benzene and 250 ml. of hexane was added. This solution was filtered to remove a small amount of insoluble material. The filtrate was again evaporated under vacuum. A thick brown oil was obtained weighing 168 g. An elemental analysis of this product yielded the following results: Carbon, 49.5%; hydrogen, 6.2%; iodine, 33.8%.

EXAMPLE 4

This example describes the preparation of N-butoxymethyl - 2' - tert-butyl-2-chloro - 6' - methylacetanilide. 60 g. of chloroacetyl chloride and 100 g. of n-heptane were placed in a 1-liter 4-neck flask. Over a ten-minute period and with stirring was added to the flask 87.5 g. (0.5 mole) of 2-tert-butyl-6-methyl - N - methyleneaniline and the temperature rose from 20° C. to 75° C. The flask contents were heated briefly to 103° C. pot temperature and allowed to cool to 30° C. using a drying tube on the condenser to exclude moisture. Next 296 g. (4 moles) of n-butanol containing 60 g. of triethylamine was poured into the flask and the mixture was stirred for fifteen. During this period the temperature rose to 35° C. and some solid was evident. The reaction mixture was poured into 750 ml. of cold water, was mixed by shaking the flask, and an oil layer separated. The solvent was removed from the oil layer by distillation. When about one-half of the solvent had been removed, a voluminous precipitate of triethylamine hydrochloride fine needles formed and was removed by filtration. The filtrate was vacuum distilled to a pot temperature of 75 C. at 25 mm. pressure. The residual product weighed 175 g. and to this product was added 200 ml. of toluene. The flask containing the toluene solution of the product was placed in a deep freeze overnight. The next morning the precipitate appearing in the flask was removed from the toluene solution by filtration and the precipitate was washed with n-heptane. The filtrate was evaporated under 10 mm. pressure to a pot temperature of 105° C. Weight of the recovered product was 156 g. The product was turbid and 200 ml. of heptane and 5 g. of activated carbon was added to the product. The carbon was removed by filtration and the filtrate containing the dissolved product was evaporated under vacuum, finishing the evaporation at 0.07 mm. pressure and 130° C. pot temperature to provide a translucent, dark amber oil having a refractive index of $n_D^{25}$ 1.5210. Upon vacuum distillation using a Vigreux column, the main fraction distilled over as a colorless oil, boiling between 150° and 155° C. at 0.07 mm. mercury and having a refractive index of $n_D^{25}$ 1.5210. Infrared analysis confirmed the molecular analysis, and the elemental analysis gave the following results:

Calc'd for $C_{18}H_{28}ClNO_2$ (percent): C, 66.4; H, 8.7; Cl, 10.9. Found (percent): C, 66.1; H, 8.5; Cl, 10.9.

EXAMPLE 5

This example describes the preparation of 2-chloro-2',6'-diethyl - N - (methoxymethyl)acetanilide. About 182 moles (206 g.) of chloroacetyl chloride and about 210 g. of benzene were introduced into a 2-liter, 4-neck flask, and about 293 g. (1.82 moles) of 2,6-diethyl-N-methyleneaniline was gradually added with agitation over a 25-minute period. The exothermic reaction raised the temperature of the reaction mixture to about 90° C. After cooling the mixture to about 35° C., about 250 ml. of dry methanol were added. With the reaction mixture under reflux, an excess (approximately 190 g.) of triethylamine was added dropwise. During this addition the temperature of the mixture rose to about 70° C. This temperature was maintained for about 10 minutes and then reduced to approximately 30° C. After cooling, the mixture was washed with two 500 ml. portions of water. The product was in a heavy, oily layer which was stripped of solvent by vacuum distillation with a terminal pot temperature of about 95° C. The distillation residue was then dissolved in 500 ml. of trimethylpentane and crystallized therefrom by chilling with Dry Ice. The product thus obtained had a melting point (corrected) of 38.5–39.5° C. and the following analysis:

Calculated (percent): C, 62.33; H, 7.47; Cl, 13.14, N, 5.19. Found (percent): C, 62.20; H, 7.50; Cl, 13.31; N, 5.21.

EXAMPLES 6 THROUGH 84

The following compounds were also prepared by substantial repetition of the general procedures set forth in the following examples:

6. 2'-tert-butyl-2-chloro-N-hexoxymethyl - 6' - methylacetanilide.
7. N - (allyloxymethyl)-2-bromo-2'-tert-butyl-6'-methylacetanilide.
8. 2' - tert - butyl-2-chloro-6'-methyl-N-(2-propynoxymethyl)acetanilide.
9. 2 - bromo - 2' - tert-butyl-6'-methyl-N-(2-propynoxymethyl)acetanilide.
10. 2' - tert - butyl - 2-chloro-N-(2-methoxyethoxymethyl)-6'-methylacetanilide.
11. 2 - bromo-2' - tert-butyl-N-[2-(2-methoxyethoxy)ethoxy]methyl-6-methylacetanilide.
12. 2 - bromo - 2' - tert - butyl-N-(2,3-dihydroxypropoxymethyl)-6'-methylacetanilide.
13. 2' - tert - butyl - 2 - chloro-N-(1,3-dichloro-2-propoxymethyl)-6'-methylacetanilide.
14. 2 - bromo - 2' - tert-butyl-N-(1,3-dibromoisopropoxymethyl)-6'-methylacetanilide.
15. 2 - bromo - 2' - tert-butyl-N-(2,3-dibromoallyloxymethyl)-6'-methylacetanilide.
16. 2 - bromo - 2' - tert-butyl-N-(furfuryloxymethyl)-6'-methylacetanilide
17. 2' - tert-butyl-2-chloro-N-methoxymethyl - 4',6'-dimethylacetanilide.
18. 2' - tert - butyl - 2 - chloro-N-methoxymethyl-6'-methoxyacetanilide.
19. 2 - chloro - 2'-tert-amyl-N-methoxymethyl-6'-methylacetanilide.
20. 2 - bromo - 2',6'-diethyl-N-(methoxymethyl)acetanilide.
21. 2 - iodo - 2',6'-diethyl-N-(methoxymethyl)acetanilide.
22. 2 - chloro - 2',6'-diethyl-N-(ethoxymethyl)acetanilide.
23. 2 - chloro - 2',6' - diethyl-N-(allyloxymethyl)acetanilide.
24. 2 - chloro - 2',6' - dimethyl-N-(isobutoxymethyl)-acetanilide.
25. 2 - chloro - N-(methoxymethyl)-2'-methylacetanilide.
26. 2 - bromo-2'-tert-butyl-N-[(2,2,2-trifluoroethoxy)-methyl]-o-acetotoluidide.
27. 2' - tert - butyl-2-chloro-N-(methoxymethyl)acetanilide.
28. 2-chloro-N-(methoxymethyl)acetanilide.
29. 2 - chloro-2',6'-dimethyl-N-(methoxymethyl)acetanilide.
30. 2 - chloro - 2',6' - diethyl-N-(isopropoxymethyl)-acetanilide.
31. 2-chloro - 2',6' - dimethyl-N-(isopropoxymethyl)-acetanilide.
32. 2 - bromo - 2'-tert-butyl-6'-ethyl-N-(methoxymethyl)acetanilide.
33. 2 - chloro - 2',6'-diethyl-N-[(1-methylheptyloxy)-methyl]acetanilide.
34. 2 - bromo - 2'-tert-butyl-6'-methoxy-N-(methoxymethyl)acetanilide.
35. 2 - chloro - 2',6' - dimethyl-N-(tetrahydrofurfuryloxymethyl)acetanilide.
36. 2 - bromo-2'-methyl-6'-tert-butyl-N-[(2,4-dichloro-6-formylphenoxy)methyl]acetanilide.
37. 2,3' - dichloro - 2'-methyl-N-(isopropoxymethyl)-acetanilide.
38. 2,4',5' - trichloro - 2'-tert-butyl-N-(methoxymethyl)acetanilide.

39. 2 - chloro-2',6'-diethyl-N-[(1-methoxy-3-phenoxyisopropoxy)methyl]acetanilide.
40. 2 - chloro - 2',6' - diethyl-N-[(2-chloroallyloxy)methyl]acetanilide.
41. 2 - bromo-2'-methyl-6'-tert-butyl-N-[(pentachlorophenoxy)methyl]acetanilide.
42. 2 - chloro - 2',6'-diethyl-N-{{2-[2-(2-methoxyethoxy)ethoxy]ethoxy}methyl}acetanilide.
43. 2,5' - dichloro - 2' - methyl-N-(methoxymethyl)-acetanilide.
44. 2,4' - dichloro - 2'-methyl-N-(isopropoxymethyl)-acetanilide.
45. 2 - chloro - 2',6'-diethyl-N-(3-oxobutoxymethyl)-acetanilide.
46. 2 - bromo - 2' - tert-butyl-6'-methyl-N-(4-chlorophenylthiomethyl)acetanilide.
47. 2 - chloro-2',6' - dimethyl-N-(allyloxymethyl)acetanilide.
48. 2 - chloro - 2',6'-dimethyl-N-[(2-methoxyethoxy)methyl]acetanilide.
49. 2 - chloro - 2',6' - dimethyl-N-[(2-isopropoxyethoxy)methyl]acetanilide.
50. 2 - chloro - 2',6'-dimethyl-N-(propoxymethyl)acetanilide.
51. 2 - chloro - 2',6'-dimethyl-N-(isopentoxymethyl)-acetanilide.
52. 2 - chloro - 2',6'-dimethyl-N-[(3-methoxybutoxy)-methyl]acetanilide.
53. 2 - chloro - 2'-methyl-6'-ethyl-N-(ethoxymethyl)-acetanilide.
54. 2 - chloro - 2'-methyl-6'-ethyl-N-(methoxymethyl)-acetanilide.
55. 2 - chloro - 2',6' - diethyl-N-(isobutoxymethyl)-acetanilide.
56. 2 - chloro - 2',6' - diethyl-N-[(2-methoxyethoxy) methyl]acetanilide.
57. 2 - chloro - 2',6'-diethyl-N-[(2-isopropoxyethoxy)-methyl]acetanilide.
58. 2 - chloro - 2' - methyl-6'-isopropyl-N-(methoxymethyl)acetanilide.
59. 2 - chloro - 2',6'-diethyl-N-(propoxymethyl)acetanilide.
60. 2 - chloro - 2',6'-dimethyl-N-(butoxymethyl)acetanilide.
61. 2 - chloro - 2'-methyl-6'-ethyl-N-(propoxymethyl)-
62. 2 - chloro - 2'-methyl-6'-ethyl-N-(butoxymethyl)-acetanilide.
63. 2 - chloro - 2'-methyl-6'-ethyl-N-[(2-isopropoxyethoxy)methyl]acetanilide.
64. 2 - chloro - 2',6'-dimethyl-N-(tert-butoxymethyl)-acetanilide.
65. 2 - chloro - 2',6' - diethyl-N-(tert-butoxymethyl)-acetanilide.
66. 2 - chloro - 2',6' - diethyl-N-(butoxymethyl)acetanilide.
67. 2 - iodo - 2',3'-dimethyl-6'-tert-butyl-N-(methoxymethyl)acetanilide.
68. 2 - bromo - 2',4' - dimethyl-6'-tert-butyl-N-(methoxymethyl)acetanilide.
69. 2 - chloro - 2',3' - dimethyl-6'-tert-butyl-N-(methoxymethyl)acetanilide.
70. 2 - bromo - 2' - methyl-6'-tert-amyl-N-(methoxymethyl)acetanilide.
71. 2 - chloro - 2',6'-diethyl-N-[2-(2-methoxyethoxy)-ethoxy]methyl acetanilide.
72. 2 - chloro - 2',6'-dimethyl-N-[(2-allyloxyethoxy)-methyl]acetanilide.
73. 2 - chloro - 2',6'-diethyl-N-(2-propynoxymethyl)-acetanilide.
74. 2 - chloro - 2',6' - diethyl-N-[(2-chloropropoxy)-methyl]acetanilide.
75. 2 - chloro - 2',6'-diethyl-N-[(2-chloroethoxy)methyl]acetanilide.
76. 2 - chloro - 2',6' - diethyl-N-[(2-hydroxyethoxy)-methyl]acetanilide.
77. 2 - chloro-2',6'-diethyl-N-[(1-methoxyisopropoxy)-methyl]acetanilide.
78. 2 - chloro - 2',6'-diethyl-N-(sec-butoxymethyl)acetanilide.
79. 2 - chloro - 2',6' - diethyl-N-[(2-phenoxyethoxy)-methyl]acetanilide.
80. 2 - chloro - 2',6'-diethyl-N-(cyclohexoxymethyl)-acetanilide.
81. 2 - bromo- 2'-methyl-6'-tert-butyl-N-[(2-sec-butyl)-4,6-dinitrophenoxy)methyl]acetanilide.
82. 2 - bromo - 2'-methyl-6'-tert-butyl-N-(1-ethylnylcyclohexyloxymethyl)acetanilide.
83. 2 - chloro - 2',6'-dimethyl-N-(2,4-dichloro-alphamethoxybenzyl)acetanilide.
84. 2 - chloro-2'-tert-butyl-6'-ethyl-N-(ethoxymethyl)-acetanilide.

In order to illustrate the advantages of the present invention, the pre-emergence phytotoxic or herbicidal ratings of representative alpha-haloacetanilides were determined in greenhouse tests in which a specific number of seeds of a number of different plants, each representing a principal botanical type, were planted in greenhouse flats.

A good grade of top soil was placed in aluminum pans and compacted to a depth of ⅜ to ½ inch from the top of the pan. On the top of the soil was placed a predetermined number of seeds of various plant species. In the surface application the seeds were covered by overfilling the pan with soil and striking it level. The measured amount of chemical in a suitable solvent or as a wettable powder was applied to this surface. In the soil incorporation treatments the soil required to level fill the pans after seeding was weighed into a pan, a known amount of the chemical applied in a solvent or as a wettable powder, the soil thoroughly mixed, and used as a cover layer for seeded pans. After treatment the pans were moved into a greenhouse bench where they were watered from below as needed to give adequate moisture for germination and growth.

Approximately 14 days after seeding and treating, the plants were observed and the results recorded. The phytotoxic rating was obtained by means of a fixed scale based on the average percent germination of each seed lot. The ratings are defined as follows:

0—No phytotoxicity     2—Moderate phytotoxicity
1—Slight phytotoxicity     3—Severe phytotoxicity The pre-emergence herbicidal activity of the alpha-haloacetanilides are recorded in Tables I and II for various application rates in both surface and soil-incorporated applications. In Table I, the various seeds are represented by letters as follows:

C—Morning glory     L—Barnyard
D—Wild oats     M—Crabgrass
E—Brome grass     N—Pigweed
F—Rye grass     O—Soybean
G—Radish     P—Wild buckwheat
H—Sugar beet     Q—Tomato
I—Cotton     R—Sorghum
J—Corn     S—Rice
K—Foxtail In Table II, the various seeds are represented by letters as follows:

A—Cotton     I—Brome grass
B—Corn     J—Pigweed
C—Soybean     K—Barnyard grass
D—Cocklebur     L—Sugar beet
E—Crabgrass     M—Wheat
F—Lambsquarter     N—Velvet leaf
G—Wild oats     O—Rice
H—Smart weed     P—Coffeeweed Individual injury ratings for each plant type are reported. The total injury rating for all grass plants and the total injury rating for all broadleaf plants are also reported. In the column entitled, "Comments," (1) indicates surface application of the herbicide and (2) indicates its incorporation into the soil. The data in Tables I and II illustrated the outstanding general and selective phytotoxic activity of the alpha-haloacetanilides under consideration.

TABLE I.—PRE-EMERGENCE HERBICIDAL ACTIVITY

| Compound of Example | Rate, lb./acre | C | D | E | F | G | H | I | J | K | L | M | N | O | P | Q | R | S | Grass | Broadleaf | Comments |
|---|---|---|---|---|---|---|---|---|---|---|---|---|---|---|---|---|---|---|---|---|---|
| No. 1 | 1 | 3 | 3 | 3 | 3 | 2 | 3 | 2 | 3 | 3 | 3 | 3 | 3 | 2 | 2 | 3 | 3 | 3 | 27 | 20 | (2) |
|  | .05 | 1 | 2 | 1 | 3 | 1 | 3 | 0 | 1 | 3 | 3 | 3 | 2 | 0 | 2 | 3 | 1 | 0 | 17 | 12 | (2) |
| No. 2 | 1 | 3 | 3 | 3 | 3 | 3 | 2 | 1 | 3 | 3 | 3 | 3 | 3 | 1 | 1 | 2 | 3 | 3 | 27 | 16 | (2) |
|  | .05 | 0 | 2 | 3 | 3 | 0 | 0 | 0 | 0 | 2 | 3 | 3 | 1 | 1 | 0 | 0 | 3 | 3 | 22 | 2 | (2) |
| No. 3 | 1 | 1 | 3 | 3 | 3 | 0 | 2 | 0 | 3 | 3 | 3 | 3 | 3 | 0 | 1 | 2 | 3 | 3 | 27 | 9 | (2) |
|  | ¼ | 0 | 3 | 3 | 3 | 0 | 1 | 0 | 2 | 3 | 3 | 3 | 3 | 1 | 0 | 2 | 3 | 3 | 26 | 7 | (2) |
| No. 4 | 1 | 0 | 3 | 3 | 3 | 2 | 2 | 0 | 3 | 3 | 3 | 3 | 3 | 0 | 2 | 2 | 3 | 3 | 27 | 11 | (2) |
|  | ¼ | 1 | 3 | 3 | 3 | 1 | 1 | 0 | 1 | 3 | 3 | 3 | 1 | 0 | 0 | 3 | 3 | 3 | 25 | 7 | (2) |
| No. 5 | 1 | 1 | 3 | 3 | 3 | 0 | 3 | 0 | 1 | 3 | 3 | 3 | 3 | 0 | 3 | 3 | 3 | 3 | 25 | 13 | (2) |
|  | .05 | 0 | 1 | 1 | 1 | 0 | 1 | 0 | 0 | 3 | 2 | 3 | 2 | 0 | 3 | 1 | 1 | 0 | 12 | 7 | (2) |
| No. 6 | 5 | 2 | 3 | 3 | 3 | 1 | 2 |  |  | 3 |  | 3 | 3 | 1 | 1 | 1 | 3 |  | 18 | 11 | (1) |
|  | 1 | 0 | 0 | 0 | 0 | 0 | 0 | 0 | 0 | 3 | 2 | 3 | 0 | 0 | 0 | 0 | 2 | 0 | 10 | 0 | (2) |
| No. 7 | 5 | 2 | 3 | 3 | 3 | 2 | 3 |  |  | 3 |  | 3 | 3 | 0 | 2 | 2 | 3 |  | 18 | 14 | (1) |
|  | .05 | 2 | 3 | 3 | 3 | 0 | 0 | 0 | 0 | 3 | 3 | 3 | 1 | 0 | 0 | 0 | 3 | 2 | 23 | 3 | (2) |
| No. 8 | 1 | 3 | 3 | 3 | 3 | 3 | 3 | 1 | 3 | 3 | 3 | 3 | 3 | 0 | 3 | 3 | 3 | 3 | 27 | 18 | (2) |
|  | .05 | 0 | 2 | 3 | 3 | 0 | 0 | 0 | 0 | 3 | 3 | 3 | 2 | 0 | 0 | 1 | 3 | 2 | 22 | 3 | (2) |
| No. 10 | 1 | 2 | 3 | 3 | 3 | 2 | 3 | 1 | 3 | 3 | 3 | 3 | 3 | 2 | 1 | 3 | 3 | 3 | 27 | 17 | (2) |
|  | .05 | 1 | 2 | 3 | 3 | 0 | 1 |  | 0 | 3 | 3 | 3 | 2 | 0 | 0 | 1 | 3 | 2 | 22 | 4 | (2) |
| No. 13 | 5 | 3 | 3 | 3 | 3 | 3 | 3 |  |  | 3 |  | 3 | 3 | 3 | 3 | 3 | 3 |  | 18 | 21 | (1) |
|  | 1 | 1 | 3 | 3 | 3 | 1 | 0 | 0 | 0 | 3 | 3 | 3 | 3 | 1 | 1 | 3 | 3 |  | 24 | 8 | (1) |
| No. 16 | 5 | 2 | 3 | 3 | 3 | 2 | 2 | 0 | 2 | 3 | 3 | 3 | 3 | 2 | 3 | 3 | 3 | 3 | 26 | 17 | (2) |
|  | ¼ | 0 | 3 | 2 | 3 | 2 |  | 0 | 0 | 3 | 3 | 3 | 3 | 1 | 0 | 2 | 3 | 1 | 21 | 8 | (2) |
| No. 25 | 1 | 0 | 2 | 3 | 3 | 0 | 0 | 0 | 0 | 3 | 3 | 3 | 3 | 0 | 0 | 0 | 3 | 3 | 23 | 5 | (2) |
|  | .05 | 0 | 0 | 0 | 1 | 0 | 0 | 0 | 0 | 3 | 3 | 3 | 2 | 0 | 0 | 0 | 1 | 1 | 12 | 2 | (2) |
| No. 22 |  | 5 | 2 | 3 | 3 | 3 | 3 | 3 |  |  | 3 |  | 3 | 3 | 2 | 3 | 3 | 3 |  | 18 | 19 | (1) |
| No. 23 |  | 1 | 0 | 3 | 3 | 3 | 0 | 1 |  |  | 3 |  | 3 | 3 | 0 | 2 | 0 | 3 |  | 18 | 6 | (1) |
| No. 24 | 5 | 3 | 3 | 3 | 3 | 3 | 3 |  |  | 3 |  | 3 | 3 | 1 | 3 | 3 | 3 |  | 15 | 19 | (1) |
|  | 1 |  |  | 3 | 3 |  | 2 | 1 | 2 |  | 3 | 3 | 3 | 0 |  |  |  | 3 | 15 | 6 | (2) |
| No. 26 | 1 | 0 | 3 | 3 | 3 | 0 | 0 | 0 | 0 | 3 | 3 | 3 | 2 | 0 | 0 | 0 | 3 | 3 | 24 | 2 | (2) |
|  | ¼ | 0 | 1 | 3 | 3 | 0 | 0 | 0 | 0 | 3 | 2 | 3 | 0 | 0 | 0 | 0 | 3 | 2 | 20 | 0 | (2) |
| No. 27 | 1 | 1 | 3 | 3 | 3 | 0 | 2 | 1 | 1 | 3 | 3 | 3 | 3 | 0 | 1 | 1 | 3 | 3 | 25 | 9 | (2) |
|  | ¼ | 0 | 2 | 2 | 2 | 0 | 0 | 0 | 0 | 3 | 3 | 3 | 2 | 0 | 0 | 0 | 3 | 2 | 20 | 4 | (2) |
| No. 28 | 1 | 0 | 0 | 3 | 2 | 0 | 1 | 0 | 0 | 3 | 3 | 3 | 3 | 0 | 1 | 0 | 0 | 2 | 16 | 5 | (2) |
|  | ¼ | 0 | 0 | 0 | 0 | 0 | 1 | 0 | 0 | 0 | 2 | 1 | 1 | 1 | 0 | 0 | 2 | 1 | 6 | 3 | (2) |
| No. 29 |  | 5 | 3 | 3 | 3 | 3 | 2 | 2 |  |  | 3 |  | 3 | 3 | 0 | 2 | 3 | 3 |  | 18 | 15 | (1) |
|  | 1 |  |  | 3 | 3 |  | 3 | 0 | 2 |  | 3 | 3 | 3 | 0 |  |  |  | 3 | 17 | 6 | (2) |
| No. 30 | 5 | 2 | 3 | 3 | 3 | 3 | 2 |  |  | 3 |  | 3 | 3 | 1 | 3 | 3 | 3 |  | 18 | 17 | (1) |
|  | 1 |  |  | 3 | 3 |  | 3 | 0 | 1 |  | 3 | 3 | 3 | 0 |  |  |  | 3 | 16 | 6 | (2) |
| No. 31 | 1 | 2 | 3 | 3 | 3 | 1 | 1 |  |  | 3 |  | 3 | 3 | 0 | 0 | 1 | 3 |  | 18 | 7 | (2) |
|  | .05 | 2 | 0 | 0 | 0 | 3 | 0 | 2 | 1 | 2 | 2 | 3 | 1 | 1 | 0 | 1 | 1 |  | 9 | 13 | (2) |
| No. 37 |  | 5 | 0 | 3 | 3 | 3 | 0 | 1 |  |  | 3 |  | 3 | 3 | 0 | 0 | 0 | 3 |  | 18 | 4 | (1) |
| No. 40 |  | 5 | 1 | 3 | 3 | 3 | 0 | 1 |  |  | 3 |  | 3 | 3 | 0 | 0 | 3 | 3 |  | 18 | 8 | (1) |
| No. 46 |  | ¼ | 2 | 3 | 3 | 3 | 1 | 1 | 0 | 0 | 3 | 3 | 3 | 2 | 1 | 0 | 3 | 3 | 1 | 22 | 10 | (2) |

TABLE II.—PRE-EMERGENCE HERBICIDAL ACTIVITY

| Compound of Example | Rate, lb./acre | A | B | C | D | E | F | G | H | I | J | K | L | M | N | O | P | Grass | Broadleaf | Comments |
|---|---|---|---|---|---|---|---|---|---|---|---|---|---|---|---|---|---|---|---|---|
| No. 35 | 1 | 0 | 0 | 0 | 0 | 3 | 2 | 3 | 3 | 3 | 3 | 3 | 1 | 0 | 0 | 1 | 0 | 13 | 9 | (2) |
| No. 41 | 5 | 0 | 0 | 0 |  | 3 | 3 | 3 | 1 | 3 | 3 | 3 | 1 | 1 | 0 | 0 | 0 | 13 | 8 | (1) |
| No. 43 | 1 | 1 | 0 | 0 | 3 | 3 | 3 | 3 | 2 | 3 | 3 | 3 | 3 | 1 | 1 | 3 | 2 | 16 | 18 | (1) |
| No. 45 | ¼ | 0 | 0 | 0 | 0 | 3 | 2 | 2 | 3 | 2 | 1 | 3 | 0 | 0 | 0 | 2 | 0 | 12 | 6 | (1) |
| No. 47 | 1 | 0 | 0 | 0 | 0 | 3 | 3 | 3 | 2 | 3 | 3 | 3 | 2 | 1 | 1 | 2 | 2 | 15 | 13 | (1) |
| No. 48 | 1 | 0 | 1 | 0 | 0 | 3 | 3 | 3 | 2 | 3 | 3 | 3 | 0 | 1 | 0 | 1 | 1 | 14 | 9 | (1) |
| No. 49 | ¼ | 0 | 1 | 0 | 0 | 3 | 3 | 1 | 1 | 3 | 3 | 3 | 1 | 0 | 0 | 0 | 0 | 11 | 8 | (1) |
| No. 50 | ¼ | 0 | 0 | 0 | 1 | 3 | 2 | 3 | 3 | 3 | 3 | 3 | 2 | 2 | 1 | 3 | 1 | 17 | 13 | (1) |
| No. 51 | ¼ | 0 | 0 | 0 | 0 | 3 | 2 | 2 | 1 | 3 | 3 | 3 | 0 | 0 | 0 | 0 | 0 | 11 | 6 | (1) |
| No. 52 | 0.05 | 0 | 0 | 0 | 0 | 3 | 1 | 2 | 3 | 3 | 2 | 3 | 2 | 0 | 0 | 3 | 1 | 14 | 8 | (2) |
| No. 53 | 1 | 1 | 2 | 0 | 0 | 3 |  | 3 | 3 | 3 | 3 | 3 | 3 | 1 | 3 | 2 |  | 20 | 13 | (2) |
| No. 54 | 1 | 0 | 3 | 0 | 0 | 3 |  | 3 | 3 | 3 | 3 | 3 | 3 | 3 | 1 | 3 | 2 | 21 | 12 | (2) |
| No. 55 | 1 | 2 | 0 | 1 | 0 | 3 | 3 | 3 | 2 | 3 | 3 | 3 | 1 | 3 | 0 | 3 | 2 | 18 | 14 | (2) |
| No. 56 | 1 | 1 | 2 | 1 | 0 | 3 | 3 | 3 | 3 | 3 | 3 | 3 | 1 | 3 | 0 | 3 | 2 | 20 | 14 | (2) |
| No. 57 | 1 | 1 | 0 | 0 | 0 | 2 | 0 | 3 | 2 | 3 | 3 | 3 | 0 | 2 | 0 | 1 | 0 | 14 | 6 | (2) |
| No. 58 | ¼ |  | 1 | 1 | 0 | 3 | 3 | 3 | 1 | 2 | 2 | 3 | 1 | 3 | 0 | 3 | 1 | 18 | 9 | (1) |
| No. 59 | ¼ | 0 | 0 | 0 | 0 | 3 | 1 | 3 | 0 | 3 | 3 | 3 | 0 | 1 | 1 | 0 | 0 | 13 | 5 | (1) |
| No. 60 | ¼ | 0 | 0 | 0 | 2 | 3 | 2 | 3 | 3 | 3 | 3 | 3 | 0 | 2 | 2 | 0 | 0 | 14 | 12 | (1) |
| No. 61 | ¼ | 0 | 1 | 0 | 0 | 3 |  | 3 | 3 | 3 | 3 | 3 | 2 | 1 | 0 | 3 | 1 | 17 | 9 | (1) |
| No. 62 | 1 | 0 | 0 | 0 | 0 | 3 |  | 3 | 3 | 3 | 3 | 3 | 2 | 2 | 0 | 0 | 1 | 14 | 9 | (1) |
| No. 63 | ¼ | 0 | 0 | 0 | 0 | 3 |  | 1 | 2 | 3 | 2 | 3 | 0 | 0 | 0 | 0 | 0 | 10 | 4 | (1) |
| No. 64 | ¼ | 0 | 2 | 0 | 0 | 3 | 3 | 3 | 3 | 3 | 3 | 3 | 1 | 1 | 0 | 3 | 1 | 18 | 11 | (1) |
| No. 65 | 1 | 0 | 0 | 0 | 0 | 2 | 3 | 1 | 0 | 3 | 0 | 3 | 0 | 1 | 0 | 2 | 0 | 12 | 3 | (2) |
| No. 66 | ¼ | 0 | 0 | 0 | 0 | 3 | 3 | 2 | 2 | 3 | 3 | 3 | 0 | 0 | 0 | 0 |  | 11 | 8 | (1) |
| No. 67 | 1 | 0 | 3 | 0 |  | 3 | 2 | 3 | 2 | 3 | 3 | 3 | 0 | 3 | 0 | 3 | 0 | 21 | 7 | (2) |
| No. 70 | ¼ |  | 2 | 0 | 0 | 3 | 3 | 3 | 0 | 3 | 3 | 3 | 0 | 2 | 0 | 3 | 0 | 19 | 6 | (1) |
| No. 71 | ¼ | 1 | 0 | 0 | 0 | 3 | 1 | 2 | 1 | 3 | 3 | 3 | 1 | 1 | 0 | 3 | 1 | 15 | 18 | (2) |
| No. 72 | 1 | 0 | 0 | 0 | 0 | 3 | 3 | 3 | 3 | 3 | 3 | 2 | 1 | 1 | 0 | 0 | 0 | 13 | 9 | (2) |
| No. 73 | 1 | 0 | 2 | 1 | 1 | 3 | 3 | 3 | 3 | 3 | 3 | 3 | 2 | 3 | 3 | 3 | 3 | 20 | 19 | (2) |
| No. 74 | 1 | 0 | 0 | 0 | 0 | 3 | 0 | 3 | 2 | 3 | 3 | 3 | 0 | 0 | 0 | 1 | 0 | 13 | 5 | (2) |
| No. 75 | 1 | 0 | 0 | 0 | 0 | 3 | 1 | 3 | 3 | 3 | 3 | 3 | 1 | 2 | 0 | 2 | 0 | 16 | 7 | (2) |
| No. 77 | 1 | 0 | 0 | 0 | 0 | 3 | 0 | 3 | 3 | 3 | 3 | 3 | 1 | 1 | 0 | 3 | 0 | 16 | 7 | (2) |
| No. 78 | ¼ | 0 | 0 | 0 | 0 | 3 | 1 | 3 | 1 | 3 | 2 | 3 | 0 | 1 |  | 2 | 0 | 15 | 4 | (2) |
| No. 79 | 1 | 1 | 1 | 0 | 0 | 2 | 1 | 0 | 0 | 1 | 2 | 3 | 2 | 0 | 0 | 0 | 0 | 7 | 6 | (2) |
| No. 80 | 1 | 0 | 0 | 0 | 0 | 3 | 1 | 3 | 2 | 3 | 3 | 3 | 1 | 2 | 0 | 2 | 0 | 16 | 6 | (2) |
| No. 81 | 1 | 0 | 0 | 0 | 0 |  | 3 |  | 3 |  | 3 | 3 | 3 |  |  | 2 |  | 14 | 6 | (2) |
| No. 82 | 1 | 1 | 1 | 0 |  | 3 |  | 0 |  | 2 | 1 | 3 | 0 |  |  | 0 |  | 9 | 2 | (2) |

The contact activity of representative alpha-haloacetanilides was determined in greenhouse tests. The compound to be tested was applied in spray form to plants of a given age of the same grasses and broadleaf plants as used in the above pre-emergence tests; and the same number of seeds of the same plants were planted in aluminum pans. After the plants were the desired age, each aluminum pan was sprayed with a given volume of a 0.5% concentration solution of the candidate chemical, corresponding to a rate of approximately 10 lbs. per acre. This solution was prepared from an aliquot of a 2% solution of the candidate compound in acetone, a known amount of cyclohexanone-emulsifying agent mix, and sufficient water to make up to volume. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed approximately 14 days later and reported in Table III.

The foregoing date are purely illustrative; the other alphahaloacetanilides set forth have equally beneficial properties.

EXAMPLE 85

In this example is illustrated the surprising pre-emergence herbicidal superiority of the haloacetanilides of this invention as compared to closely related haloacetanilides which do not have the same structure as the haloacetanilides of this invention. Pre-emergent greenhouse tests were used in this example with the test compound incorporated in the soil mixture. The preparation of the pans containing seeds and the application of the test compounds were carried out in the same manner as described with respect to the data reported in Tables I and II. The definitions for the herbicidal ratings are also the same as previously stated.

The comparison in Table IV shows that compound No. 84 of this invention had the greater herbicidal activity on 8 more plant species of the 18 species in this side-by-side test than did the related compound, 2-chloro-2'-tert-butyl - 6' - ethyl - N - (ethoxy)acetanilide. Thus, compound No. 84, 2-chloro-2'-tert-butyl-6'-ethyl-N-(ethoxymethyl)acetanilide is 25% more effective in the control of plant species at a rate of application of 1/8 lb./acre than the related acetanilide having an ethoxyethyl group, instead of an ethoxymethyl group, substituted on the nitrogen atom.

TABLE III.—CONTACT PHYTOTOXIC ACTIVITY OF ALPHA-HALOACETANILIDE

| Compound | General grass | General broadleaf |
|---|---|---|
| Compound of Example No. 1 | 3 | 2 |
| Compound of Example No. 2 | 1 | 2 |
| Compound of Example No. 8 | 2 | 2 |
| Compound of Example No. 9 | 1 | 3 |
| Compound of Example No. 13 | 1 | 2 |
| Compound of Example No. 14 | 1 | 1 |
| Compound of Example No. 15 | 1 | 1 |
| Compound of Example No. 16 | 1 | 3 |
| Compound of Example No. 22 | 2 | 2 |
| Compound of Example No. 24 | 2 | 2 |
| Compound of Example No. 30 | 2 | 2 |
| Compound of Example No. 55 | 2 | 2 |
| Compound of Example No. 56 | 2 | 2 |
| Compound of Example No. 78 | 2 | 1 |

TABLE IV

| | | Herbicidal rating at 1/8 lb./acre | | Compound having higher rating | |
|---|---|---|---|---|---|
| | | Compound AA | Compound No. 84 | Compound AA | Compound No. 84 |
| 1 | Alfalfa | 0 | 2 | | X |
| 2 | Dodder | 0 | 2 | | X |
| 3 | Flax | 0 | 1 | | X |
| 4 | Cantaloupe | 0 | 0 | | |
| 5 | Sugar beets | 0 | 0 | | |
| 6 | Barnyard grass | 3 | 3 | | |
| 7 | Crabgrass | 3 | 3 | | |
| 8 | Pigweed | 0 | 2 | | X |
| 9 | Bromus tectorum | 3 | 3 | | |
| 10 | Spinach | 0 | 0 | | |
| 11 | Quackgrass | 3 | 3 | | |
| 12 | Tomatoes | 0 | 0 | | |
| 13 | Purslane | 0 | 2 | | X |
| 14 | Johnsongrass | 3 | 3 | | |
| 15 | Table beets | 0 | 1 | | X |
| 16 | Rabbit grass | 3 | 3 | | |
| 17 | Wild oats | 2 | 3 | | X |
| 18 | Lettuce | 1 | 3 | | X |
| Totals | | | | 0 | 8 |

Compound AA—2-chloro-2'-tert-butyl-6'-ethyl-N-(2-ethoxyethyl)acetanilide.
Compound No. 84—2-chloro-2'-tert-butyl-6'-ethyl-N-(ethoxymethyl)acetanilide.

TABLE V

| | | Herbicidal rating at 0.2 lb./acre | | Compound having higher rating | |
|---|---|---|---|---|---|
| | | Compound BB | Compound No. 2 | Compound BB | Compound No. 2 |
| 1 | Cotton | 0 | 0 | | |
| 2 | Corn | 1 | 2 | | X |
| 3 | Soybean | 0 | 0 | | |
| 4 | Crabgrass | 3 | 3 | | |
| 5 | Lambsquarter | 0 | 2 | | X |
| 6 | Wild oats | 2 | 2 | | |
| 7 | Smart weed | 0 | 1 | | X |
| 8 | Brome | 0 | 3 | | X |
| 9 | Pigweed | 2 | 3 | | X |
| 10 | Barnyard grass | 3 | 3 | | |
| 11 | Sugar beet | 0 | 1 | | X |
| 12 | Wheat | 1 | 1 | | |
| 13 | Velvet leaf | 0 | 0 | | |
| 14 | Rice | 1 | 2 | | X |
| 15 | Hemp Sesbania | 0 | 0 | | |
| Totals | | | | 0 | 7 |

Compound BB—2-bromo-2'-methyl-6'-tert-butyl-N-(2-methoxyethyl)acetanilide.
Compound No. 2—2-bromo-2'-methyl-6'-tert-butyl-N-(methoxymethyl)acetanilide.

The data in Table V show that compound No. 2, the acetanilide of this invention, was more effective than 2-bromo-2'-methyl-6'-tert-butyl - N - (2-methoxyethyl)acetanilide on 7 of the 15 plant species tested in this side-by-side comparison at a rate of application of 0.2 lb./acre. Thus, the 2 - bromo-2'-methyl-6'-tert-butyl-N-(methoxymethyl)acetanilide of this invention is 47% more effective in the control of plant species than the related acetanilide which differs only in the substitution of a methoxyethyl group for the methoxymethyl group of the acetanilide of this invention.

tert-butyl-N-(3-methoxypropyl)acetanilide, was not more effective on any of the plane species tested.

In summary, the data in Tables VI through VII show that the acetanilides of this invention are unexpectedly more effective in the control of various plant species than different but structurally related acetanilides. The difference in herbicidal effectiveness is directly related to the presence of an alkoxymethyl, instead of an alkoxyethyl or alkoxypropyl group, on the nitrogen atom of the acetanilide. It is immaterial, as shown in this example, whether the halo is bromine or chlorine. Also, the data

TABLE VI

| | | Herbicidal rating at ½ lb./acre | | Compound having Higher rating | |
|---|---|---|---|---|---|
| | | Compound CC | Compound No. 66 | Compound CC | Compound No. 66 |
| 1 | Alfalfa | 0 | 0 | | |
| 2 | Dodder | 0 | 1 | | X |
| 3 | Flax | 0 | 1 | | X |
| 4 | Cantaloupe | 0 | 0 | | |
| 5 | Sugar beets | 0 | 0 | | |
| 6 | Barnyard grass | 3 | 3 | | |
| 7 | Crabgrass | 3 | 3 | | |
| 8 | Pigweed | 2 | 3 | | X |
| 9 | Bromus tectorum | 3 | 3 | | |
| 10 | Spinach | 0 | 1 | | X |
| 11 | Quackgrass | 3 | 3 | | |
| 12 | Tomatoes | 0 | 3 | | X |
| 13 | Purslane | 1 | 3 | | X |
| 14 | Johnsongrass | 3 | 3 | | |
| 15 | Table beets | 0 | 0 | | |
| 16 | Rabbit grass | 3 | 3 | | |
| 17 | Wild oats | 2 | 2 | | |
| 18 | Lettuce | 2 | 3 | | X |
| | Totals | | | 0 | 6 |

Compound CC—2-chloro-2',6'-diethylacetanilide-N-(2-butoxyethyl)acetanilide.
Compound No. 66—2-chloro-2',6'-diethyl-N-(butoxymethyl)acetanilide.

As shown in Table VI, the chloroacetanilide of this invention was more effective than 2-chloro-2',6'-diethylacetanilide-N-(2-butoxyethyl)acetanilide on 6 of the 18 plant species tested at an application rate of ½ lb./acre in this side-by-side comparison. The only structural difference between the two acetanilides compared is that the acetanilide of this invention has a methoxymethyl, instead of a methoxyethyl, substituted in the nitrogen atom. However, in herbicidal properties, the acetanilide of this invention is 33% more effective in the control of plant species.

show that it is immaterial whether the substituents on the aromatic ring of the acetanilide are either primary alkyl or tertiary alkyl.

The phytotoxic compositions of this invention are either particulate solid or liquid concentrate compositions comprising the active ingredient and either a particulate solid or liquid adjuvant which is a formulation aid or conditioning agent permitting the composition to be readily mixed with a suitable solid of liquid carrier for application in a form which enables prompt assimilation by the plant systems. Thus, the compositions of this invention

TABLE VII

| | Herbicidal rating at 0.4 lb./acre | | Compound having higher rating | |
|---|---|---|---|---|
| | Compound DD | Compound No. 2 | Compound DD | Compound No. 2 |
| Cotton | 0 | 0 | | |
| Corn | 0 | 2 | | X |
| Soybean | 0 | 0 | | |
| Crabgrass | 0 | 3 | | X |
| Lambsquarter | 0 | 3 | | X |
| Wild oats | 0 | 3 | | X |
| Smartweed | 0 | 2 | | X |
| Brome | 0 | 3 | | X |
| Pigweed | 0 | 3 | | X |
| Barnyard grass | 2 | 3 | | X |
| Sugar beet | 0 | 2 | | X |
| Wheat | 0 | 2 | | X |
| Velvet leaf | 0 | 0 | | |
| Rice | 0 | 3 | | X |
| Hemp Sesbania | 0 | 2 | | X |
| Totals | | | 0 | 12 |

Compound DD—2-bromo-2'-methyl-6'-tert-butyl - N - (3-methoxypropyl) acetanilide.
Compound No. 2—2-bromo - 2' - methyl-6'-tert-butyl-N-(methoxypropyl) acetanilide.

The data in Table VII show that the methoxymethyl-substituted acetanilide of this invention is 80% more effective in the control of plant species than the methoxypropyl-substituted acetanilide. Thus, at an application rate of 0.4 lb./acre, the acetanilide of this invention had a higher herbicidal rating on 12 of the 15 plant species whereas the acetanilide compared, 2-bromo-2'-methyl-6'- include not only the concentrate compositions comprising the active ingredient and the adjuvant, but also toxicant compositions applied in the field comprising the concentrate composition (i.e., active ingredient plus adjuvant) and the carrier.

As demonstrated above, quite different effects can be obtained by modifying the method of use of the compositions of this invention. Thus, unusual grass specificity can be achieved at lower levels of application whereas at higher levels of application a more general phytotoxic effect or soil sterilization takes place. Therefore, an essential part of this invention is the formulation of compositions so as to permit a uniform predetermined application of the composition to the plant environment to produce the desired effect.

Phytotoxic adjuvants useful in preparing the concentrate compositions include particulate solid or liquid extending agents such as solvents or diluents within which the active ingredient is dissolved, suspended, or distributed; wetting or emulsifying agents which serve in providing uniform dispersions or solutions of the active ingredient in the extending agents; and adhesive agents or spreading agents which improve the contact of the active ingredient with the soil or plant surfaces. All compositions of this invention include at least one of the above types of adjuvants and usually include an extending agent and a wetting or emulsifying agent because of the nature of the physical properties of the alpha-haloacetanilides.

In general, the alpha-haloacetanilides are insoluble in water and in many organic solvents. The active ingredient need not be dissolved in the extending agent but may merely be dispersed or suspended. Examples of suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., kerosene, etc.), and the like. True solutions can be made by using mixtures of organic solvents, for example 1:1 and 1:2 mixtures of xylene and cyclohexanone.

Solid, particulate extending agents are also very useful in the practice of the present invention. The active ingredient is either absorbed or dispersed on or in the finely-divided solid material. Suitable solid extending agents include the natural clays, such as china clays, bentonites, and attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood and powdered pecan or walnut shells. These materials are used in finely-divided form, at least in a size range of 20–40 mesh (Tyler) and preferably in much finer size.

The particulate solid concentrate compositions are applied to the soil in admixture with a particulate solid carrier material, or as a wettable powder using a liquid carrier material. When the latter method is used, a wetting agent or surface active agent is added to the concentrate composition to render the particulate solid extending agent wettable by water, providing a stable aqueous dispersion or suspension suitable for use as a spray.

The surface active agent used in the compositions of this invention to serve in providing uniform dispersions of all formulation components of both liquid and dust types in both the concentrate compositions and the toxicant compositions applied, can be anionic, cationic, or nonionic types, including mixtures thereof. Suitable surface active agents for the preparation of both solid and liquid compositions include the conventional soaps, such as salts of long-chain carboxylic acids; sulfonated animal, vegetable, and mineral oils; quaternary salts of high molecular weight acids; rosin soaps, such as salts of abietic acid; sulfuric acid salts of high molecular weight organic compounds; algin soaps, ethylene oxide condensated with fatty acids, alkyl phenol and mercaptans; and other simple and polymeric compositions having both hydrophilic and hydrophobic functions.

The liquid concentrate compositions of this invention preferably comprise from about 5% to about 95% by weight of the active ingredient and the remainder the adjuvant, which may be solely liquid extending agent or surface active agent (including adhesive agent), but preferably is a combination of liquid extending agent and surface active agent. It is preferred, however, that the herbicidal adjuvant be the major component in the composition. Preferably the surface active agent comprises from approximately 0.1% to about 15% by weight of the total concentrate composition, the remainder of the composition being liquid extending agent.

Since the alpha-haloacetanilides are very toxic and are usually applied at low rates to obtain selectivity, the concentration of the active ingredient in the dust compositions may be as low as 1% or less by weight. When the dust compositions are to be used for soil sterilization, it is desirable to have a high concentration and the active ingredient may constitute as much as 5% to 98% by weight of the total composition. The remainder of the compositions consists of the adjuvants.

The carrier material, used for the uniform distribution of the alpha-haloacetanilides in effective amounts, can be either a liquid or a particulate solid material. Normally, the carrier material is the major component in the compositions as applied, and constitutes more than 50% by weight of the composition. For reasons of economy, water is the preferred liquid carrier, both for the liquid concentrate composition and the wettable powder concentrate. Suitable solid carriers include the particulate extending agents noted above, also solid fertilizers such as ammonium nitrate, urea, and superphosphate, as well as other materials in which plant organisms take root and grow, such as compost, manure, humus, sand and the like.

The compositions of this invention can also contain other additaments such as fertilizers and pesticides, used as, or in combination with, the carrier materials.

For example, phytotoxicants useful in combination with the above-described compounds include 2,4-dichlorophenoxyacetic acids, 2,4,5 - trichlorophenoxyacetic acid, 2-methyl - 4 - chlorophenoxyacetic acid and the salts, esters and amides thereof; triazine derivatives, such as 2,4-bis-(3-methoxypropylamino) - 6 - methylthio - S - triazine; 2-chloro - 4 - ethylamino - 6 - isopropylamino-S-triazine, and 2 - ethylamino - 4 - isopropylamino - 6 - methyl-mercapto-S-triazine; urea derivatives, such as 3-(3,4 - dichlorophenyl) - 1,1 - dimethyl urea, 3 - (3,4 - dichlorophenyl) - 1 - methyl - 1 - methoxy urea and 3-(p-chlorophenyl) - 1,1 - dimethyl urea; acetanilides such as N-isopropyl - alpha - chloroacetanilide, and N - ethyl - alpha-chloro - 2 - methyl acetanilide and 2 - tert - butyl - 2'-chloro - 6 - methylacetanilide, and acetamides such as N,N - diallyl - alpha - chloroacetamide, N-(alpha-chloroacetyl)hexamethylene imine, and N,N - diethyl - alpha-bromoacetamide, and 2,4,6-trichlorobenzyl chloride and the like.

The present compositions can be applied to the foliage of growing plants by the use of power-dusters, broom and hand sprayers, spray-dusters, by addition to irrigation water, and by other conventional means. The compositions can also be applied from airplanes as a dust or a spray because they are effective in very low dosages.

The dosage to be applied to the plant system is dependent not only upon the specific alpha-haloacetanilide, but also upon the particular plant species to be modified and the stage of growth thereof, as well as the part of the plant to be contacted with the toxicant. In non-selective foliage treatments the compositions of this invention are usually applied at an approximate rate of from 5 to 50 lbs. of alpha-haloacetanilide per acre but lower or higher rates are appropriate in some cases. In nonselective preemergence treatments, these compositions are usually applied at a somewhat lower rate, but one within the same general range; that is, from 1 to 25 lbs. per acre. However, because of the unusually high unit activity possessed by the present compositions, soil sterilization is ordinarily accomplished at a rate in the range of 1 to 10 lbs. per acre. In selective pre-emergence applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

Although the invention is described with respect to specific modifications, the details thereof are not to be construed as limitations except to the extent indicated in the following claims.

What is claimed is:
1. A herbicidal composition comprising an adjuvant and an effective amount of an alpha-haloacetanilide of the formula

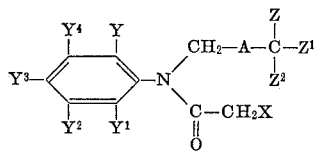

wherein Y and $Y^1$ are hydrogen, alkyl or alkoxy each of a maximum of 10 carbon atoms,
$Y^2$, $Y^3$, and $Y^4$ are hydrogen, halogen, or alkyl each of a maximum of 10 carbon atoms,
A is oxygen or sulfur,
X is chlorine, bromine, or iodine, and
Z, $Z^1$ and $Z^2$ are hydrogen, alkyl, alkenyl, alkynyl, alkoxy, polyalkoxy, alkoxyalkyl, polyalkoxyalkyl, haloalkyl, hydroxyalkyl, haloalkenyl, oxoalkyl, and alkenyloxyalkyl each of a maximum of 18 carbon atoms; aryl, aryloxyalkyl, haloaryl, haloaryloxyalkyl and arylalkyl of from 6 to 24 carbon atoms; furfuryl; and tetrahydrofurfuryl; or two of Z, $Z^1$ or $Z^2$ groups are combined to form a cyclic group of from 2 to 6 carbon atoms selected from the group consisting of

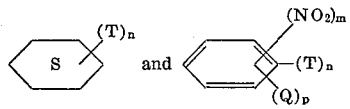

wherein T is chlorine, bromine or fluorine, Q is alkyl of a maximum of 6 carbon atoms or acyl of a maximum of 4 carbon atoms, m is an integer of from 0 to 3 inclusive, n is an integer of from 0 to 5 inclusive, and p is an integer of 0 or 1.

2. The herbicidal composition of claim 1 wherein said alpha-haloacetanilide is 2-chloro-2'-methyl-6'-ethyl-N-(ethoxymethyl)acetanilide.

3. The herbicidal composition of claim 1 wherein said alpha-haloacetanilide is 2-chloro-2',6'-diethyl-N-(butoxymethyl)acetanilide.

4. The herbicidal composition of claim 1 wherein said alpha-haloacetanilide is 2-chloro-2',6'-diethyl-N-(methoxymethyl)acetanilide.

5. The herbicidal composition of claim 1 wherein said alpha-haloacetanilide is 2-chloro-2'-tert-butyl-6'-methyl-N-(methoxymethyl)acetanilide.

6. A herbicidal composition in accordance with claim 1 in which A is oxygen.

7. A herbicidal composition in accordance with claim 6 in which both Y and $Y^1$ are alkyl having a maximum of ten carbon atoms.

8. A herbicidal composition in accordance with claim 7 in which X is chlorine and $Y^2$, $Y^3$ and $Y^4$ are hydrogen.

9. A herbicidal composition in accordance with claim 8 in which Z and $Z^1$ are hydrogen.

10. A herbicidal composition in accordance with claim 9 in which Y is tertiary butyl and $Y^1$ is primary or secondary alkyl.

11. A herbicidal composition in accordance with claim 9 in which both Y and $Y^1$ are primary or secondary alkyl.

12. A herbicidal composition in accordance with claim 9 in which $Z^2$ is hydrogen.

13. A herbicidal composition in accordance with claim 9 in which $Z^2$ is alkyl.

14. A herbicidal composition in accordance with claim 9 in which $Z^2$ is alkenyl.

15. A herbicidal composition in accordance with claim 9 in which $Z^2$ is alkynyl.

16. A herbicidal composition in accordance with claim 9 in which $Z^2$ is polyalkoxyalkyl.

17. A herbicidal composition in accordance with claim 6 in which Y is alkyl and $Y^1$ is hydrogen.

18. A herbicidal composition in accordance with claim 17 in which at least one of the groups $Y^2$, $Y^3$ and $Y^4$ is other than hydrogen.

19. A herbicidal composition of claim 1 wherein said alpha-haloacetanilide is 2-chloro-2',6'-dimethyl-N-(methoxymethyl)acetanilide.

20. The herbicidal composition of claim 1 wherein A is oxygen, X is bromine, Y is primary alkyl, $Y^1$ is tertiary alkyl, $Y^2$, $Y^3$ and $Y^4$ are hydrogen, Z and $Z^2$ are hydrogen and $Z^1$ is alkyl.

21. The herbicidal composition of claim 1 wherein said alpha-haloacetanilide is 2-chloro-2',6'-dimethyl-N-(isobutoxymethyl)acetanilide.

22. The herbicidal composition of claim 1 wherein said alpha-haloacetanilide is 2-chloro-2',6'-dimethyl-N-(isopropoxymethyl)acetanilide.

23. A herbicidal method which comprises applying to soil an effective amount of an alpha-haloacetanilide of the formula

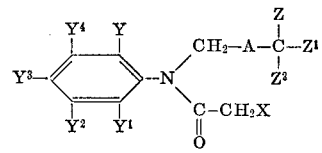

wherein Y and $Y^1$ are hydrogen, alkyl or alkoxy each of a maximum of 10 carbon atoms,
$Y^2$, $Y^3$, and $Y^4$ are hydrogen, halogen, or alkyl each of a maximum of 10 carbon atoms,
A is oxygen or sulfur,
X is chlorine, bromine, or iodine, and
Z, $Z^1$ and $Z^2$ are hydrogen, alkyl, alkenyl, alkynyl, alkoxy, polyalkoxy, alkoxyalkyl, polyalkoxyalkyl, haloalkyl, hydroxyalkyl, haloalkenyl, oxoalkyl, and alkenyloxyalkyl each of a maximum of 18 carbon atoms; aryl, aryloxyalkyl, haloaryl, haloaryloxyalkyl and arylalkyl of from 6 to 24 carbon atoms; furfuryl; and tetrahydrofurfuryl; or two of Z, $Z^1$ or $Z^2$ groups are combined to form a cyclic group of from 2 to 6 carbon atoms selected from the group consisting of

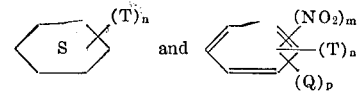

wherein T is chlorine, bromine or fluorine, Q is alkyl of a maximum of 6 carbon atoms or acyl of a maximum of 4 carbon atoms, m is an integer of from 0 to 3 inclusive, n is an integer of from 0 to 5 inclusive, and p is an integer of 0 or 1.

24. A method in accordance with claim 23 in which said alpha-haloacetanilide is 2-chloro-2',6'-diethyl-N-(butoxymethyl)acetanilide.

25. A method in accordance with claim 23 in which said alpha-haloacetanilide is 2-chloro-2',6'-diethyl-N-(methoxymethyl)acetanilide.

26. A herbicidal method in accordance with claim 23 in which A is oxygen.

27. A herbicidal method in accordance with claim 26 in which both Y and $Y^1$ are alkyl.

28. A herbicidal method in accordance with claim 27 in which X is chlorine and $Y^2$, $Y^3$ and $Y^4$ are hydrogen.

29. A herbicidal method in accordance with claim 28 in which Z and $Z^1$ are hydrogen.

30. A herbicidal method in accordance with claim 29 in which Y is tertiary butyl and $Y^1$ is primary or secondary alkyl.

31. A herbicidal method in accordance with claim 29 in which both Y and $Y^1$ are primary or secondary alkyl.

32. A herbicidal method in accordance with claim 29 in which $Z^2$ is alkyl.

33. A herbicidal method in accordance with claim 23 wherein said alpha-haloacetanilide is 2-chloro - 2',6' - dimethyl-N-(methoxymethyl)acetanilide.

34. A herbicidal method which comprises applying to plants an effective amount of an alpha-haloacetanilide of the formula

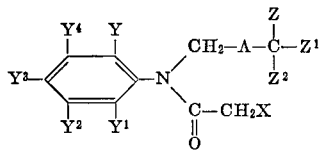

wherein Y and $Y^1$ are hydrogen, alkyl or alkoxy each of a maximum of 10 carbon atoms, $Y^2$, $Y^3$, and $Y^4$ are hydrogen, halogen, or alkyl each of a maximum of 10 carbon atoms, A is oxygen or sulfur, X is chlorine, bromine, or iodine, and Z, $Z^1$ and $Z^2$ are hydrogen, alkyl, alkenyl, alkynyl, alkoxy, polyalkoxy, alkoxyalkyl, polyalkoxyalkyl, haloalkyl, hydroxyalkyl, haloalkenyl, oxoalkyl, and alkenyloxyalkyl each of a maximum of 18 carbon atoms; aryl, aryloxyalkyl, haloaryl, haloaryloxyalkyl and arylalkyl of from 6 to 24 carbon atoms; furfuryl; and tetrahydrofurfuryl; or two of Z, $Z^1$ or $Z^2$ groups are combined to form a cyclic group of from 2 to 6 carbon atoms selected from the group consisting of

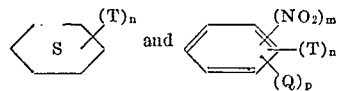

wherein T is chlorine, bromine or fluorine, Q is alkyl of a maximum of 6 carbon atoms or acyl of a maximum of 4 carbon atoms, $m$ is an integer of from 0 to 3 inclusive, $n$ is an integer of from 0 to 5 inclusive, and $p$ is an integer of 0 or 1.

References Cited

UNITED STATES PATENTS

| | | | |
|---|---|---|---|
| 2,863,752 | 12/1958 | Hamm et al. | 71—118 |
| 3,268,324 | 8/1966 | Hamm et al. | 71—118 |

FOREIGN PATENTS 622,131  12/1962  Belgium.

LEWIS GOTTS, Primary Examiner

C. L. MILLS, Assistant Examiner

U.S. Cl. X.R.

71—88, 93, 98, 116, 117

UNITED STATES PATENT OFFICE
CERTIFICATE OF CORRECTION

Patent No. 3,547,620    Dated December 15, 1970

Inventor(s) John F. Olin

It is certified that error appears in the above-identified patent and that said Letters Patent are hereby corrected as shown below:

Delete the second structural formula appearing at Column 1, 1 43-46; Column 2, lines 40-43; Column 17, lines 39-43; Column lines 52-56; and Column 20, lines 6-10, and substitute theref

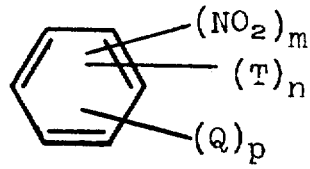

Column 4, line 55, delete "tertbutyl" and substitute therefor -- tert-butyl --; and line 66, delete "portion" and substitut therefor -- portions --.

Column 5, line 20, insert --minutes-- between "fifteen" and the period.

Column 6, line 10, delete "following" and substitute therefor -- foregoing --; and amend line 22 to read -- ethoxy/methyl-6 methylacetanilide. --.

Column 7, line 45, at the end of the line add -- acetanilide

Column 8, line 9, delete ")".

Column 12, line 4, delete "date" and substitute therefor -- d and line 25, delete the entire line and substitute therefor -- butyl-6'-ethyl-N-(ethoxyethyl)acetanilide. Thus, com- --.

Column 14, line 2, delete "plane" and substitute therefor -- plant --.

Column 13-14, in TABLE VII, immediately above line 70, delete "Compound No. 2 - 2-bromo-2'-methyl-6'-tert-butyl-N-(methoxy-propyl)acetanilide" and substitute therefor -- Compound (Continued)

Page 2
UNITED STATES PATENT OFFICE
CERTIFICATE OF CORRECTION

Patent No. 3,547,620      Dated December 15, 1970

Inventor(s)    John F. Olin

It is certified that error appears in the above-identified patent and that said Letters Patent are hereby corrected as shown below:

(Continued)

No. 2 - 2-bromo-2'-methyl-6'-tert-butyl-N-(methoxymethyl)acetanilide --.

Column 18, line 49, delete "furyl" and substitute therefor -- furfuryl --.

Signed and sealed this 23rd day of November 1971.

(SEAL)
Attest:

EDWARD M. FLETCHER, JR.      ROBERT GOTTSCHALK
Attesting Officer             Acting Commissioner of Patents